United States Patent
Vine et al.

(10) Patent No.: US 12,259,264 B2
(45) Date of Patent: Mar. 25, 2025

(54) APPARATUS AND METHOD FOR DISPENSING DOSES OF FLAVOURING

(71) Applicant: ISHIDA EUROPE LIMITED, Birmingham (GB)

(72) Inventors: Lee Vine, Poole (GB); Andrew Geoffrey Potter, Shropshire (GB)

(73) Assignee: ISHIDA EUROPE LIMITED, Birmingham (GB)

( * ) Notice: Subject to any disclaimer, the term of this patent is extended or adjusted under 35 U.S.C. 154(b) by 0 days.

(21) Appl. No.: 17/920,542

(22) PCT Filed: Apr. 20, 2021

(86) PCT No.: PCT/GB2021/050943
§ 371 (c)(1),
(2) Date: Oct. 21, 2022

(87) PCT Pub. No.: WO2021/214446
PCT Pub. Date: Oct. 28, 2021

(65) Prior Publication Data
US 2023/0175877 A1    Jun. 8, 2023

(30) Foreign Application Priority Data

Apr. 22, 2020 (GB) .................................. 2005869

(51) Int. Cl.
*G01F 11/24* (2006.01)
*A23P 20/12* (2016.01)
(Continued)

(52) U.S. Cl.
CPC .............. *G01F 11/24* (2013.01); *A23P 20/12* (2016.08); *A47G 19/34* (2013.01); *G01F 11/18* (2013.01);
(Continued)

(58) Field of Classification Search
CPC ........ G01F 11/24; G01F 11/46; G01F 15/001; A23P 20/12
(Continued)

(56) References Cited

U.S. PATENT DOCUMENTS 1,617,922 A * 2/1927 Morrison ................. B67D 3/00
                                                      222/452
2,002,039 A * 5/1935 Mcphee ................... G01F 11/24
                                                      222/362
(Continued)

FOREIGN PATENT DOCUMENTS

CN        1 699 123 A    11/2005
JP     2016 008860 A     1/2016
(Continued)

OTHER PUBLICATIONS

International Search Report and Written Opinion of the International Searching Authority issued in PCT International Application No. PCT/GB2021/050943 mailed Jul. 9, 2021.
(Continued)

*Primary Examiner* — Paul R Durand
*Assistant Examiner* — Randall A Gruby
(74) *Attorney, Agent, or Firm* — SQUIRE PATTON BOGGS (US) LLP

(57) ABSTRACT

A flavouring dispenser for dispensing doses of flavouring is disclosed. The flavouring dispenser comprises a flavouring chamber for containing flavouring; a dosing member having a dosing volume for receiving flavouring from the flavouring chamber, the dosing member defining an opening to the dosing volume through which flavouring is received from the flavouring chamber. A reciprocating member is movable relative to the dosing member between a closed position, at which the opening is isolated from the flavouring chamber by the reciprocating member, to a first open position, at
(Continued)

which the opening is partially exposed to the flavouring chamber such that an amount of flavouring may enter into the dosing volume via the opening, and back to the closed position, such that the flavouring may be dispensed by the dosing member. The first open position of the reciprocating member is adjustable such that degree to which the opening is exposed to the flavouring chamber may be changed so as to adjust the amount of flavouring received in the dosing volume.

20 Claims, 10 Drawing Sheets

(51) Int. Cl.
    *A47G 19/34*         (2006.01)
    *G01F 11/18*         (2006.01)
    *G01F 11/40*         (2006.01)
    *G01F 11/46*         (2006.01)
    *G01F 15/00*         (2006.01)

(52) U.S. Cl.
    CPC .............. *G01F 11/40* (2013.01); *G01F 11/46* (2013.01); *G01F 15/001* (2013.01)

(58) Field of Classification Search
    USPC ........................ 222/424.5–457.5, 142.1–142.9
    See application file for complete search history.

(56) References Cited

U.S. PATENT DOCUMENTS

| | | | | |
|---|---|---|---|---|
| 2,584,781 | A * | 2/1952 | Beatty | G01F 11/24 222/242 |
| 3,129,853 | A * | 4/1964 | Hoskins | A47G 19/34 222/362 |
| 3,179,303 | A | 4/1965 | Dankoff et al. | |
| 3,754,688 | A * | 8/1973 | Colvin | G01F 11/24 222/362 |
| 3,921,863 | A * | 11/1975 | Welch | G01F 11/24 222/370 |
| 4,006,842 | A | 2/1977 | Bassignani | |
| 4,032,050 | A * | 6/1977 | Funk | G01F 11/24 222/362 |
| 4,071,171 | A * | 1/1978 | Bassignani | G01F 11/46 222/305 |
| 4,174,058 | A * | 11/1979 | Bassignani | G01F 11/24 222/452 |
| 5,458,684 | A * | 10/1995 | Miller | B05B 1/3093 118/313 |
| 5,495,962 | A * | 3/1996 | Nomura | G01F 11/46 222/452 |
| 5,580,227 | A | 12/1996 | Rappenhöner | |
| 5,772,086 | A * | 6/1998 | Krafft | G01F 11/24 222/450 |
| 6,024,258 | A | 2/2000 | D'Alterio | |
| 6,550,640 | B2 * | 4/2003 | Smith | G01F 11/24 222/430 |
| 7,090,098 | B2 * | 8/2006 | Livingston | G01F 11/46 222/651 |
| 7,950,550 | B2 * | 5/2011 | Webster | B65D 83/06 222/181.3 |
| D642,869 | S * | 8/2011 | Webster | D7/589 |
| 8,579,166 | B2 * | 11/2013 | Bernhardsgruetter | A47J 31/404 222/145.5 |
| 8,833,614 | B2 * | 9/2014 | Webster | G01F 11/46 222/504 |
| 10,508,944 | B2 * | 12/2019 | Vine | G01F 11/18 |
| 11,662,239 | B2 * | 5/2023 | Kepler | B65D 83/0409 222/1 |
| 2005/0247742 | A1 * | 11/2005 | Livingston | G01F 11/46 222/444 |
| 2007/0228083 | A1 * | 10/2007 | Catani | G01F 11/46 222/452 |
| 2008/0054014 | A1 * | 3/2008 | Webster | G01F 11/46 222/1 |
| 2010/0006123 | A1 * | 1/2010 | Simpson | C11D 3/10 510/367 |

FOREIGN PATENT DOCUMENTS

| | | |
|---|---|---|
| WO | WO 1998/036249 A1 | 8/1998 |
| WO | WO 2007/120133 A2 | 10/2007 |
| WO | WO 2018/037233 A1 | 3/2018 |

OTHER PUBLICATIONS

Search Report for GB2005869.9, dated Oct. 22, 2020.

* cited by examiner

APPARATUS AND METHOD FOR DISPENSING DOSES OF FLAVOURING

CROSS-REFERENCE TO RELATED APPLICATIONS

This application is a national-stage filing under 35 USC 371 (c) of International Application No. PCT/GB2021/050943, filed Apr. 20, 2021, which claims priority to, and the benefit of, Great Britain Patent Application GB2005869.9 filed Apr. 22, 2020, the entire contents of each of which are herein incorporated by reference in their entirety for all purposes.

FIELD OF THE INVENTION

The present invention is directed to an apparatus and method for dispensing flavouring, and in particular solid granular flavourings such as salt or other potato chip or crisp flavourings.

DESCRIPTION OF THE RELATED ART

When coating individual batches of product in flavouring, it is desirable to ensure that a known and predetermined amount of flavouring is dispensed for each batch of product. Typically, in the art, this has been achieved by weighing a desired amount of flavouring in a weigher before dispensing this downstream for use in further processes. Flavouring dispensers which use a weigher to weigh out a known amount of flavouring are typically quite slow, as they require the flavouring to be settled and held still in order to accurately establish the weight of the flavouring to be dispensed.

Alternative flavouring dispensers are known that measure a quantity of flavouring by filling a volume with flavouring and inferring the weight of the flavouring by knowing its density. An example of a volumetric flavouring dispenser may be found in WO 2018/037233 A1. This flavouring dispenser features a plate having an aperture that is rotated in a flavouring chamber. One side of the aperture opens into a flavouring chamber over part of a rotation cycle so that the aperture may fill with flavouring, before the aperture is isolated from the flavouring chamber and the second side opened at a different location in the rotation cycle to dispense the predetermined volume of flavouring. This type of flavouring dispenser provides for doses to be measured out and dispensed quickly.

While volumetric flavouring dispensers offer improved speed of operation, a common problem with apparatuses, such as the one noted above, is that it can be difficult to adjust the system to dispense different volumes of flavouring.

For example, the dispenser disclosed in WO 2018/037233 A1 requires the replacement of an internal part, i.e. the plate having the aperture, since it is the size of this aperture that determines the volume of flavouring being dispensed. Not only does this require operation to be ceased while an internal part replaced, but it also requires the user to have a different spare part for each different dose size to be dispensed by the apparatus.

It is therefore desirable to provide a flavouring dispenser in which the amount of flavouring being dispensed can more readily be adjusted.

SUMMARY OF THE INVENTION

In accordance with a first aspect of the invention, there is provided a flavouring dispenser for dispensing doses of flavouring, the flavouring dispenser comprising: a flavouring chamber for containing flavouring; a dosing member having a dosing volume for receiving flavouring from the flavouring chamber, the dosing member defining an opening to the dosing volume through which flavouring is received from the flavouring chamber; a reciprocating member movable relative to the dosing member between a closed position, at which the opening is isolated from the flavouring chamber by the reciprocating member, to a first open position, at which the opening is partially exposed to the flavouring chamber such that an amount of flavouring may enter into the dosing volume via the opening, and back to the closed position, such that the flavouring may be dispensed by the dosing member; wherein the first open position of the reciprocating member is adjustable such that the degree to which the opening is exposed to the flavouring chamber may be changed so as to adjust the amount of flavouring received in the dosing volume.

By providing an apparatus in which a reciprocating motion is used to only partially expose the volume that receives a dose of flavouring, the amount of flavouring that enters into that dosing volume can be controlled by adjusting the degree to which the volume is exposed. This is because the partial exposure will restrict the amount of flavouring that can flow into the dosing volume before either the flavouring has filled as much of the volume as it can reach or the aperture opening is closed on the return stroke of the reciprocation action. Exposing only a very small amount of the opening to the dosing volume will only allow a small amount of flavouring to enter, while exposing a larger amount will allow more flavouring to enter. Advantageously, the degree to which the opening is exposed to the flavouring chamber can be simply adjusted, e.g. by changing the range of the reciprocating motion. This could be adjusted by controlling the drive means operating the reciprocating member or by providing an adjustable physical stop in the apparatus that prevents the reciprocating member from moving beyond a certain point.

A particular advantage of this apparatus is that the amount of flavouring to be dispensed may be infinitely adjustable. For example, a continuous range of possible reciprocating motions between exposing just over 0% of the opening to exposing 100% of the opening may be available to choose from when adjusting the size of the dose being dispensed by the apparatus. This provides a high level of control to the size of the dose being dispensed.

The flavouring chamber will typically be defined by one or more walls and a base. The dosing member may, for example, be a region of the base of the flavouring chamber that comprises an aperture through the base. The reciprocating member may reciprocate to selectively cover and partially uncover this aperture. As will be explained in more detail below, in such constructions, the aperture in the base of the flavouring chamber will typically be closed at its lower opening by a dispensing member such that the dosing volume is made up by the thickness of the base (and hence the depth of the aperture) and the lateral extent of the aperture.

While the apparatus merely requires relative motion between the reciprocating member and the dosing member, it is preferred that the dosing member is fixed in use and the reciprocating member movable. The reciprocating member will typically be movable relative to (preferably within) the flavouring chamber and/or the dosing member fixed relative to the flavouring chamber. This is advantageous in that it allows the reciprocating member to agitate the flavouring within the flavouring chamber as it covers and uncovers the opening to the dosing volume and so promote consistent filling of the dosing volume. This is particularly useful when flavourings that are not free-flowing are being dispensed, such as many flavourings for potato chips.

In particularly preferred embodiments, the reciprocating member is movable relative to the dosing member between the closed position and a second open position (different to the first open position), at which the opening is partially exposed to the flavouring chamber such that an amount of flavouring may enter into the dosing volume via the opening, and back to the closed position, such that the flavouring may be dispensed by the dosing member, wherein the second open position of the reciprocating member is adjustable such that degree to which the opening is exposed to the flavouring chamber may be changed so as to adjust the amount of flavouring received in the dosing volume. A second open position may improve the speed and efficiency of the apparatus.

For example, the reciprocating member may be movable relative to the dosing member between the first open position and the second open position by passing through the closed position such that one full reciprocation cycle of the reciprocating member includes both the first and second open positions. In other words, one full reciprocation cycle of the reciprocating member may dispense two doses of flavouring rather than one. Since reversing the direction of motion of the reciprocating member is the most demanding part of its motion, allowing two doses to be dispensed over one cycle offers a great advantage. For example, the reciprocating member may move along a linear or arcuate path. The closed position may be located generally at the centre of the path, and the first and second open positions may correspond to exposing either a left side or a right side of the opening to the dosing volume, i.e. opposing ends of the path on along which the reciprocating member moves. The reciprocating member may move from exposing, for example, the left side of the opening to the closed position at which any flavouring is dispensed before carrying on along the path to expose the right side of the opening so as to allow more flavouring to enter the dosing volume.

While it is possible that the dosing volume may have only one opening—for example, if the opening was vertically arranged so that it could fill and dispense through the same opening—as has been described above, it is preferable that the dosing member further defines a second opening to the dosing volume, through which flavouring is dispensed from the dosing volume, and further comprises a dispensing member configured to selectively open and close the second opening. The dispensing member may be operable to close the second opening while the dosing volume is receiving flavouring from the flavouring chamber and then open the second opening as the dosing volume is isolated from the flavouring chamber. In high-speed apparatuses, the second opening may begin to open as the first opening begins to close and vice versa without permitting any significant additional flow of flavouring into the dosing volume.

In many embodiments, the dispensing member comprises a closing surface defining a dispense opening therethrough, through which flavouring is dispensed from the flavouring dispenser, wherein the dispensing member is movable relative to the dosing member to vary the alignment of the second opening and the dispense opening so as to selectively dispense flavouring. A typical form for the dispense member to take would be a plate with an aperture therethrough, which aperture allows flavouring to be dispensed from the dosing volume as it sweeps over or is brought into alignment with the second opening of the dosing member. A region of the plate away from the aperture may act to close the second opening.

Preferably, the dispensing member is movable relative to the dosing member between at least a first filling position, at which the second opening is at least partially closed by the dispensing member, and a dispensing position, at which the dispense opening substantially aligns with the second opening. For example, the dispensing member may move between a position in which the second opening is entirely closed by the closing surface of the dispensing member to a position in which the dispense opening is at least partially aligned with the second opening to allow the flavouring to be dispensed.

Conveniently, the dispensing member may be rotationally fixed relative to the reciprocating member such that movement of the reciprocating member simultaneously operates the dispensing member. A single drive system may therefore simultaneously move the reciprocating member between the closed position and the or each open position and move the dispensing member between its filling position and its dispense position. Preferably, the closed position of the reciprocating member corresponds to the dispensing position of the dispensing member and the or each open position of the reciprocating member corresponds to a respective filling position of the dispensing member.

While the dispense opening could be smaller than the second opening, preferably the dispense opening entirely overlaps the second opening when the openings are aligned, to ensure that the flavouring is fully dispensed from the dosing volume.

As indicated above, the reciprocating member may serve an auxiliary function of displacing flavouring within the flavouring chamber so as to agitate the flavouring. Therefore, preferably the reciprocating member is located substantially entirely within the flavouring chamber in order to maximise this effect. This arrangement also allows for simple disassembly of the apparatus, e.g. for cleaning between flavouring changes, as the reciprocating member may be simply lifted out of the flavouring chamber.

In order to further improve the ability of the reciprocating member to displace flavouring, preferably the reciprocating member comprises a separating surface, which acts to close the dosing member opening so as to isolate it from the flavouring chamber, and further comprises a body extending away from the separating surface, the body acting to displace flavouring within the flavouring chamber as the reciprocating member moves between the open and closed positions. While preferred, alternatively a thin plate may act as the reciprocating member. Preferably, the body of the reciprocating member has a thickness of at least 1 cm, preferably at least 2 cm, more preferably at least 5 cm. Effectively providing the reciprocating member with a larger volume provides that more flavouring is displaced as this moves within the flavouring chamber, which improves the agitation effect.

Preferably, the body is shaped to provide the reciprocating member with a substantially wedge-shaped or triangular-shaped cross-section. Such a cross-section may help the reciprocating member to move through the flavouring in the flavouring chamber as it pushes into the flavouring, and may also help guide flavouring into the flavouring volume as it moves in the opposite direction. A triangular-shaped reciprocating member may be particularly suited to embodiments in which the reciprocating member moves between first and second open positions and has flavouring located on its either side.

Another option for improving the ability of the reciprocating member to displace flavouring and promote movement of the flavouring is to provide that the reciprocating member comprises a main portion, which closes the dosing member opening so as to isolate it from the flavouring chamber, and an ancillary portion spaced from the main portion, the ancillary portion acting to displace flavouring within the flavouring chamber as the reciprocating member moves between the open and closed positions. This ancillary portion of the reciprocating member plays no part in the opening and closing of the dosing volume, but serves to provide additional displacement of flavouring to improve flow.

As has been mentioned above, the reciprocation may involve a linear motion of the reciprocating member; however it is preferred that the reciprocating member is rotatable about an axis of rotation (i.e. to reciprocate along an arcuate path) and wherein the dosing member opening is offset from the axis of rotation. For example, the reciprocating member may comprise an arm that extends away from the axis of rotation, this arm selectively closing and partially opening the dosing volume as the member rotates. If an ancillary portion of the reciprocating member is provided, the axis of rotation may be located between the main portion of the reciprocating member and the ancillary portion of the reciprocating member. The ancillary portion may thereby counterbalance the main portion of the reciprocating member while also displacing flavouring as the member rotates. Rotation of the arm away from the closed position, i.e. away from alignment with the opening, will also rotate the ancillary portion towards the opening. Therefore, preferably the ancillary portion of the reciprocating member comprises one or more guiding surfaces configured to urge flavouring towards the opening to the dosing volume as the reciprocating member is rotated about the axis of rotation. The guiding surfaces may extend towards and preferably substantially up to the periphery of the flavouring chamber and thereby push the flavouring through the flavouring chamber as they are rotated. Preferably, the main portion and the ancillary portion divide the flavouring chamber into at least two different halves. This arrangement provides that rotation of the reciprocating member causes a large amount of movement of flavouring in the flavouring chamber.

In many embodiments, the apparatus further comprises a drive system adapted to move the reciprocating member in a reciprocating manner between the closed position and the or each open position. The range of the reciprocating motion imparted by the drive system may be adjustable in order to adjust the degree to which the opening to the dosing volume is exposed to the flavouring chamber. Preferably the drive system comprises a bi-directional rotational drive system, capable of rotating the reciprocating member in two opposite directions of rotation. Preferably, the drive system comprises a drive shaft having a tapered drive coupling. The drive system will typically be adapted to rotate the reciprocating member through at most 180° of rotation, more typically at most 120° of rotation, most typically at most about 90° of rotation to cause the reciprocating action. The rotation angle will depend on the geometry of the reciprocating member and the opening to the dosing volume, as well as the size of dose required, but smaller rotation angles will be preferred as they will allow more reciprocations, and therefore more doses, in any given time period.

Preferably, the footprint of the reciprocating member within the flavouring chamber is at least 10% of the footprint of the flavouring chamber, preferably at least 20%, more preferably at least 30%, further preferably at least 40%, most preferably at least 50%. A larger footprint provides the reciprocating member with a larger volume so that the displacing effect that promotes flow of the flavouring is enhanced. Furthermore, a larger footprint reduces the amount of flavouring that will be resisting the rotational movement of the reciprocating member and so makes the apparatus more efficient.

In accordance with a second aspect of the invention, there is provided a method of dispensing doses of flavouring comprising: providing a flavouring chamber containing flavouring; providing a dosing member having a dosing volume for receiving flavouring from the flavouring chamber, the dosing member defining an opening to the dosing volume through which flavouring is to be received from the flavouring chamber; moving a reciprocating member from a closed position, at which the opening is isolated from the flavouring chamber by the reciprocating member, to a first open position, at which the opening is partially exposed to the flavouring chamber so that an amount of flavouring enters into the dosing volume via the opening, and moving the reciprocating member back to the closed position; and dispensing the flavouring received in the dosing volume as a first dose of flavouring; wherein the first open position of the reciprocating member is selected from a plurality of possible first open positions which vary the degree to which the opening is exposed to the flavouring chamber based on a desired amount of flavouring to be received in the dosing volume.

This method may be performed using the apparatus described above and so the above comments apply equally to this method and all preferable features may likewise be implemented as part of this method.

Since the above apparatus allows for adjustment of the first open position, the present method correspondingly comprises selecting the first open position from a plurality of possible first open positions. As above, this may, for example, involve selecting the range of the reciprocating motion, and so there may be a continuous range of possible first positions. Alternatively, there may be a predetermined, finite number of possible first positions to select from.

As mentioned above, the present invention is particularly suited to solid granular flavourings and so preferably the flavouring contained in the flavouring chamber and dispensed as doses of flavouring is a solid granular flavouring. However, alternatively liquids, such as marinades, could be used.

Preferably, the method further comprises, after dispensing the flavouring received in the dosing volume, moving the reciprocating member from the closed position to a second open position at which the opening is partially exposed to the flavouring chamber so that an amount of flavouring enters into the dosing volume via the opening, and back to the closed position, and dispensing the flavouring received in the dosing volume as a second dose of flavouring, wherein the second open position of the reciprocating member is selected from a plurality of possible second open positions which vary the degree to which the opening is exposed to the flavouring chamber based on a desired amount of flavouring to be received in the dosing volume. This provides the above-described advantages of improved speed and efficiency since, in particular, one full reciprocation cycle of the reciprocating member may include both the first and second open positions and so dispense two doses of flavouring rather than one. This may be provided by providing that movement of the reciprocating member from the first open position to the closed position and to the second open position comprises moving the reciprocating member in one direction along a linear or arcuate path.

Typically, the opening is partially exposed to the flavouring chamber by substantially the same amount at the first and second open positions such that the first and second doses of flavouring are substantially the same size. However, in other embodiments, it may be preferred that the first and second dose sizes are different.

As explained above, one advantage of the present invention is that the dose sizes may be simply changed, even during operation of the apparatus, and so preferably the method comprising adjusting the first open position of the reciprocating member to a different one of the plurality of possible first open positions and moving the reciprocating member from the closed position to the adjusted first open position and back to the closed position so that a different amount of flavouring enters into the dosing volume via the opening, and dispensing the flavouring received in the dosing volume as an adjusted first dose of flavouring, the adjusted first dose of flavouring thereby having a different size than said first dose of flavouring. The second open position may be similarly adjusted. The method is thereby able to dispense different dose sizes by adjusting the first (and second) open positions as required.

BRIEF DESCRIPTION OF THE DRAWINGS

The present invention will now be described with reference to the accompanying drawings, of which.

DETAILED DESCRIPTION

An embodiment of an apparatus for dispensing flavouring will be described with reference to FIGS. 1A to 4C.

Figure 1A:
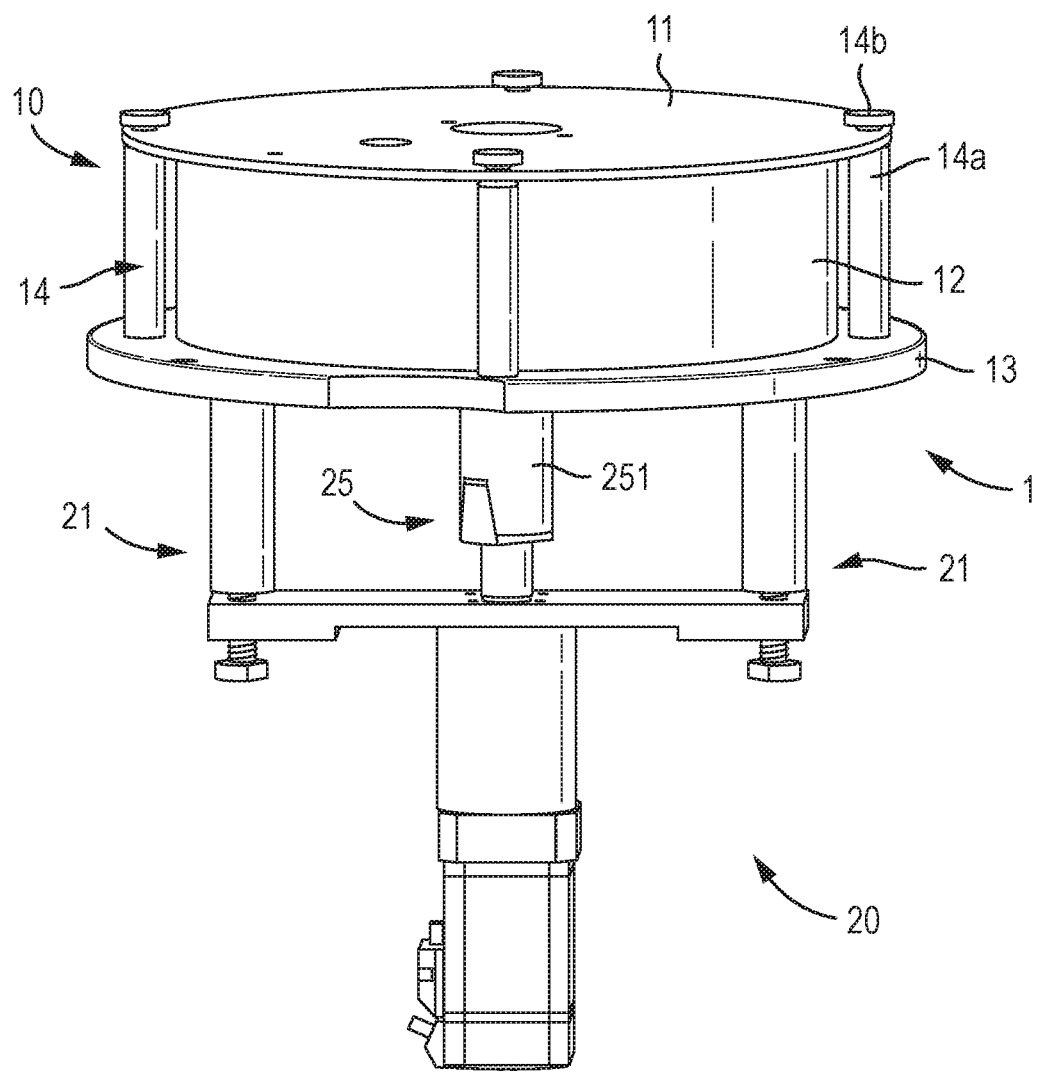
FIGS. 1A and 1B show an embodiment of an apparatus in first and second perspective views.
Figure 1B:
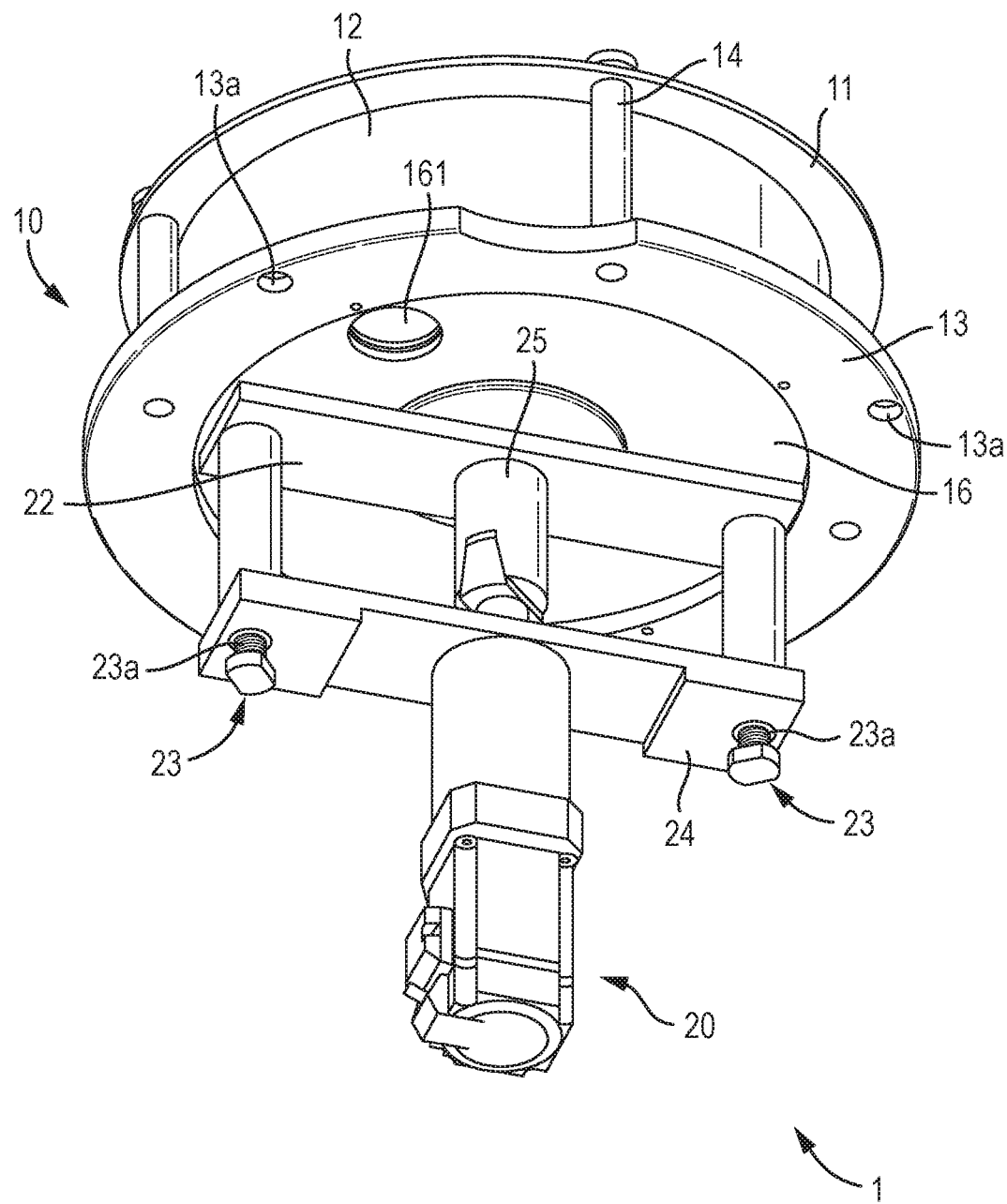

FIGS. 1A and 1B show the exterior of the flavouring dispenser 1. The flavouring dispenser comprises a housing assembly 10, which contains the flavouring supply and the elements involved in measuring out doses of the flavouring, mounted above a drive system 20 that connects into the housing assembly 10.

Viewed from the exterior, the housing assembly 10 comprises a circular lid 11 and a cylindrical sidewall 12 that connects into a recess in a lower annular support plate 13. The annular support plate extends beyond the periphery of the cylindrical sidewall to define a base flange of the housing. This base flange comprises a series of bolt holes for bolting the housing assembly 10 to a support structure (not shown). The lid 11 closes an upper opening defined by the cylindrical sidewall 12 and is larger than said upper opening so that it extends beyond the periphery of the sidewall. The lid is clamped in place by four clamping members 14, which each comprise a shaft 14a that extends from the base flange of the annular support plate 13 to the underside of lid 11. A bolt 14b of each clamping member 14 is passed through a respective aperture at the periphery of the lid and is screwed into a threaded core of the corresponding shaft 14a.

Figure 2:
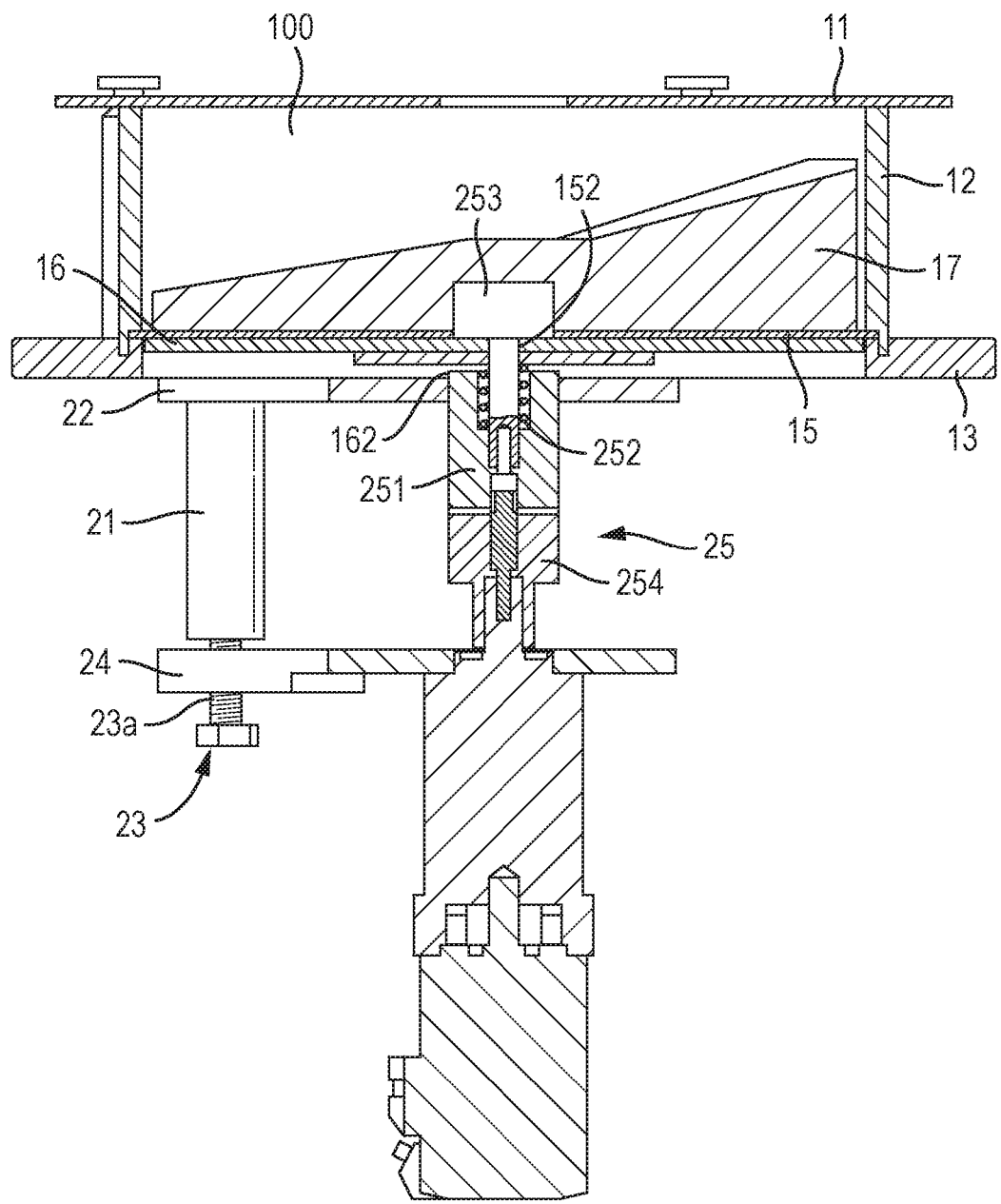
FIG. 2 shows the apparatus of FIGS. 1A and 1B in a vertical cross-section view.

The housing assembly also comprises a fixed base plate 15, which can be seen in the cross-section of FIG. 2. Said fixed base plate is circular and closes the lower end of the cylindrical sidewall 12, being connected at its periphery to the inner face of the annular support plate 13 by connecting portions 152 and 153 (visible in FIGS. 3A and 3B) that are received in complementary connecting portions (not shown) in the inner face of the lower end of the sidewall 12. The base plate 15, sidewall 12 and lid 11 together define a cylindrical flavouring chamber 100 inside the housing assembly that will contain the flavouring supply in use. The fixed base plate 15 is continuous except for an aperture 151 located off-centre that allows the base plate to act as a dosing member (i.e. that measures out doses of flavouring), as will be described in more detail below, and a central opening 152, aligned with the central axis of the cylindrical flavouring chamber 100, that allows a drive shaft assembly 25 of the drive system 20 to connect through into the flavouring chamber, as will also be discussed in more detail below.

Located immediately below the fixed base plate 15 of the housing assembly 10 is a rotatable base plate 16, which will act as a dispensing member (i.e. to selectively dispense flavouring measured out by the fixed base plate), as will be described in more detail below. The rotatable base plate 16 is circular and sits inside the annular support plate 13, but its periphery is not connected thereto, so as to allow it to rotate relative to the fixed base plate 15. The rotatable base plate 16 includes an aperture 161 located off centre and alignable with the aperture 151 in the fixed base plate 15. The rotatable base plate 16 also comprises a central opening through which the drive shaft assembly 25 passes. A spring 252 is mounted below the rotatable base plate 16, inside a first shaft element 251 of the drive system 25. This spring is coupled at its lower end to the shaft of a cap member 253 of the drive system 25, said shaft of the cap member 253 extending inside and coupling to the the shaft element 251. The upper end of the spring is then coupled to the lower surface of the rotatable base plate 16. This arrangement of the spring 252 pushes the rotatable base plate 16 upwards and firmly against the fixed base plate located directly above and pulls the cap member 253 down.

Figure 3A:
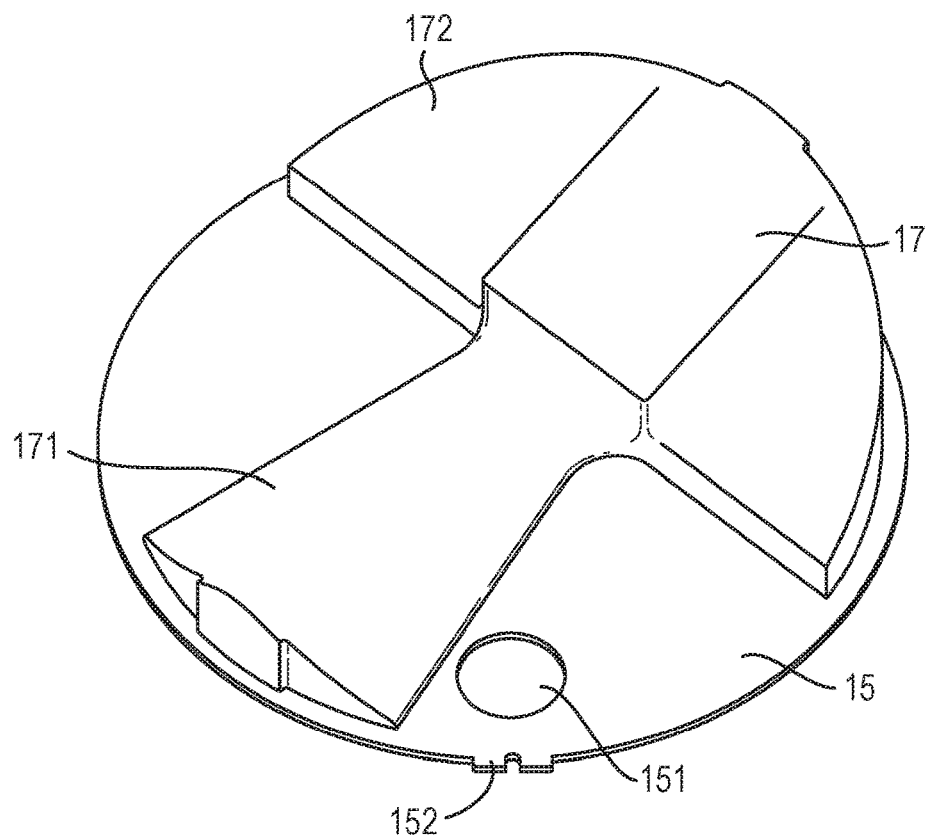
FIGS. 3A and 3B show part of the contents of the apparatus of FIGS. 1A to 2 in first and second perspective views.
Figure 3B:
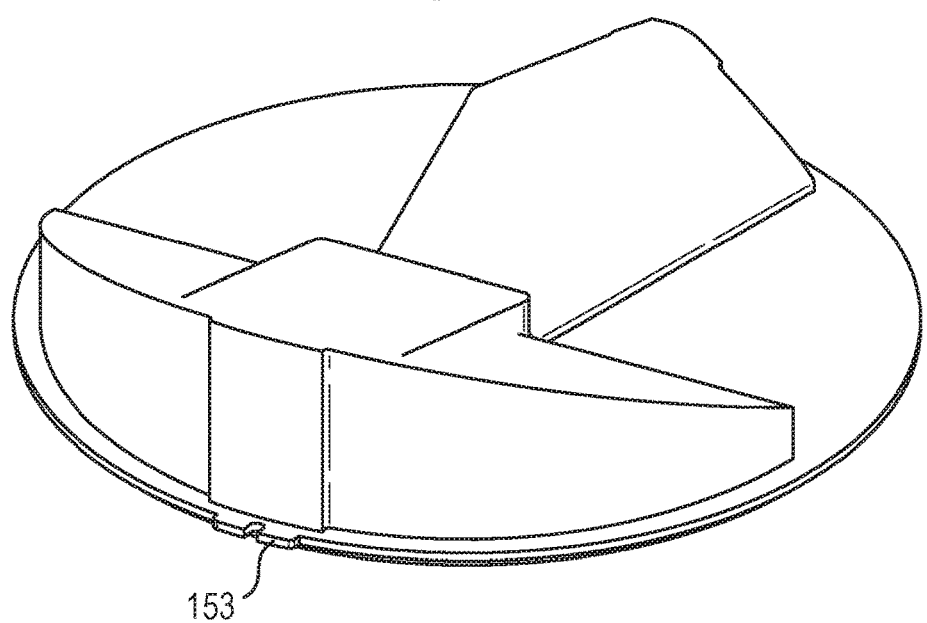

A reciprocating member 17 is located inside the flavouring chamber 100 and is shown together with the fixed base plate 15 in FIGS. 3A and 3B. The reciprocating member 17 has a flat lower surface and sits on the fixed base plate 15 and rotates relative thereto during operation of the apparatus. The reciprocating member 17 comprises a main portion 171 and an ancillary portion 172.

The main portion 171 is an arm that extends away from the centre of the flavouring chamber 100 substantially to the inner surface of the cylindrical sidewall 12. This main arm portion 171 has a generally triangular cross-section, which increases in size from the centre of the flavouring chamber 100 towards the inner periphery of the sidewall 12 so that the arm widens towards its end. The end of this arm is intended to selectively open and close the aperture 151 through the fixed base plate 15 that is located close to the periphery of the fixed base plate during the reciprocation motion, as will be described in more detail below.

The ancillary portion 172 opposes the main arm portion 171 within the flavouring chamber relative to the centre point and, in plan view, has a circular sector periphery, following the inner surface of the sidewall 12 along its outer edge. The ancillary portion has a substantial thickness and slopes down from the periphery of the flavouring chamber 100 towards the centre to guide any flavouring thereon towards the centre of the flavouring chamber. The ancillary portion serves to take up substantial volume within the flavouring chamber so as to displace a large amount of flavouring, and to push flavouring towards the aperture 151 through the fixed base plate 15 as the reciprocating member moves.

The centre of the reciprocating member connects in its lower surface to the drive system 20. The upper end of the cap member 253 connects to the lower surface of the reciprocating member and transmits the drive force to the reciprocating member. The shaft of the cap member 253 extends through the fixed and rotational base plates 15, 16, where it links to the inside of the drive shaft element 251. The aforementioned spring 252, which is coupled to the cap member, thereby pulls the reciprocating member 17 firmly down onto the fixed base plate, just as it pushes the underlying rotational base plate up. This spring therefore, effectively clamps the fixed base plate between the reciprocating member and the rotational base plate so that they will each firmly close the aperture 151 when they are arranged to cover the aperture. Furthermore, since both the reciprocating member 17 and the rotational base plate 16 are connected to the same drive system 20, they will rotate in fixed relation to one another as the drive shaft assembly 25 rotates.

The drive system 20 is implemented in a manner that reduces recoil of the drive shaft assembly 25 and this will now be described in more detail. The drive system 20 comprises a mounting structure that includes two vertical arms 21 mounted either side of the drive shaft 25 and parallel to the drive shaft. The top of each arm is fixedly connected to an upper cross-plate 22, which is located below the annular support plate 13 and extends across the width of the housing 12. In use, the annular support plate 13 is fixed to a supporting structure (not shown) by being bolted to the upper surface of the supporting structure via bolt holes 13a. The upper cross-plate 22 is fixed to the lower surface of this supporting structure on which the apparatus is mounted. This arrangement provides a fixed mounting point for both the flavouring chamber (i.e. via the annular support plate) and the drive system (i.e. via the upper cross-plate). The lower end of each arm 21, which extend downward from the upper cross-plate, connects to a bolt 23 that passes through a lower cross-plate 24. The lower cross-plate 24 supports a drive motor and gearbox, mounted beneath the lower cross-plate 24 in the Figures. The centre of the lower cross-plate couples with the drive shaft assembly 25, and in particular couples with a vertically-movable tapered drive coupling 254 of the drive shaft, the tapered drive coupling 254 being located above the lower cross-plate and able to rotate relative to the lower cross-plate 24. Each bolt 23, which passes the lower cross-plate 24, includes a spring 23a that is coupled at its lower end to the base of the bolt 23 and at its upper end to the lower face of the lower cross-plate 24. The springs 23a cause the lower cross-plate 24 to be urged upwards, which thereby urges the tapered drive coupling 254 upward into the tapered groove of the drive shaft element 251. This mounting arrangement, whereby the tapered drive coupling 254 is urged upwards, in combination with the spring 252, reduces the effect of backlash or recoil of the system as the reciprocating member rotates and so ensures that doses are produced of consistent size.

Figure 4A:
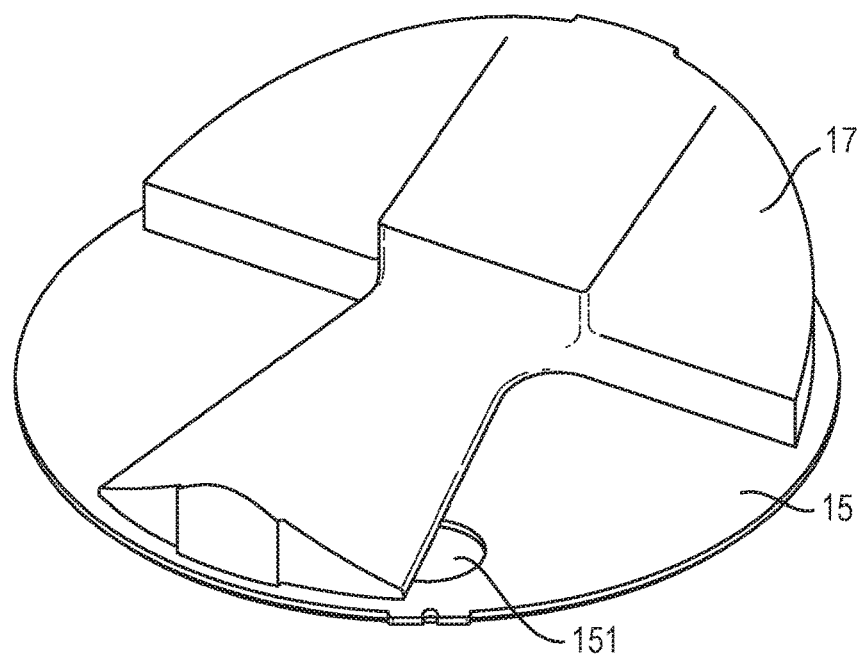
FIGS. 4A to 4C show the contents of the apparatus of FIGS. 1A to 3B at three different positions during operation.
Figure 4B:
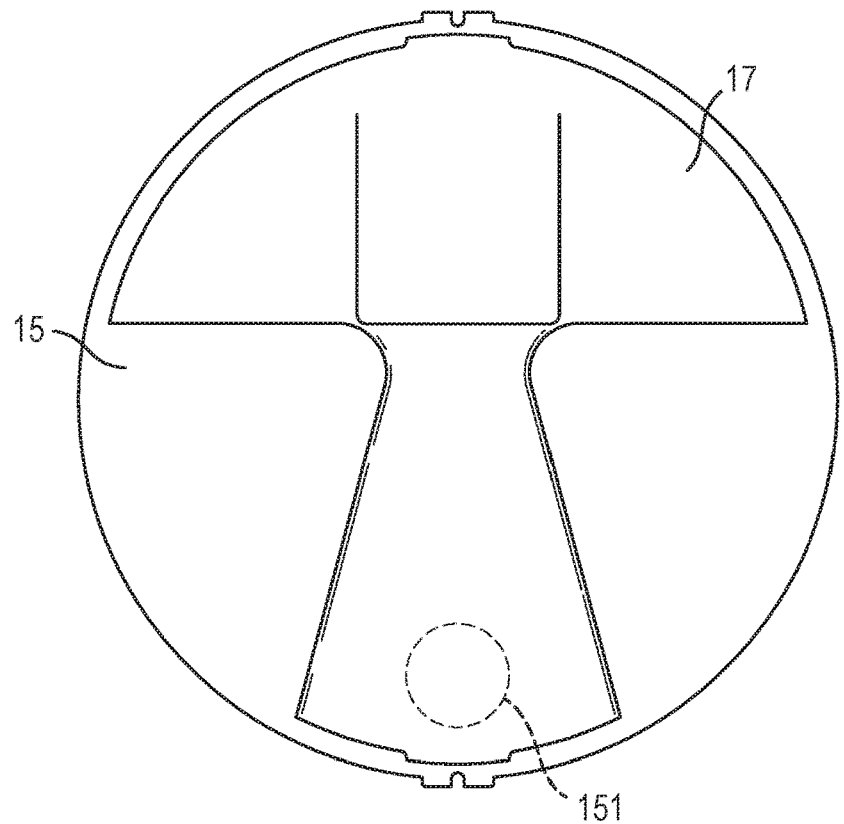
Figure 4C:
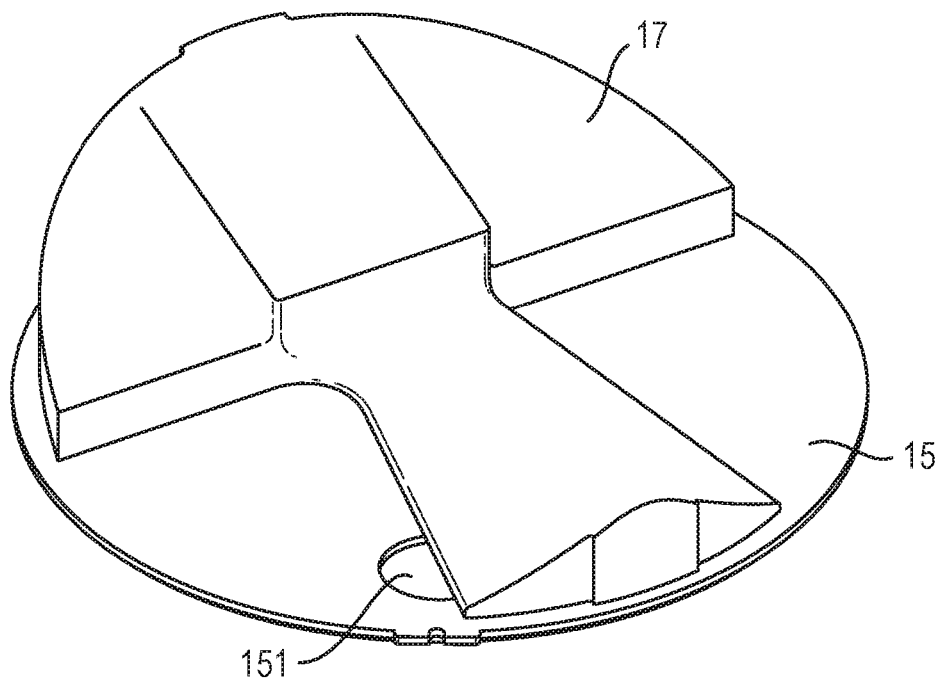

FIGS. 4A to 4C show the reciprocating member at three different positions during a reciprocation cycle.

In FIG. 4B, the reciprocating member 17 is in a closed position, in which the main portion 171, i.e. the arm, covers the aperture through the fixed base plate. This position also corresponds to a position in which the aperture 161 through rotational base plate 16 is aligned with the aperture 151 through the fixed base plate 15 so that any flavouring located in the aperture 151, i.e. in the dosing volume, is dispensed from the apparatus as it falls under gravity through the aligned openings. It will be noted that the arm 171 is provided with a width significantly greater than the width of the aperture 151 so that the arm 171 has to move some distance before the aperture begins to be exposed. As a result, the rotational base plate will also have moved some distance before the aperture 151 becomes exposed and so will be at least partially and possibly entirely closed by the rotational base plate 16 before flavouring starts to enter the aperture.

In FIG. 4A, the reciprocating member 17 has been rotated clockwise relative to its position in FIG. 4B so that the main portion 171, i.e. the arm, is now only partially covering the aperture 151 through the fixed base plate, exposing the right side of the aperture 151 to the flavouring chamber. This position of the reciprocating member 17 allows a certain amount of flavouring to enter into the aperture 151 from the flavouring chamber. In this position, the rotational base plate 16 has also rotated to move the two apertures 151, 161 out of alignment. This means that the lower side of the aperture 151 through the fixed base plate 15 is partially or fully closed, so that flavouring entering into the upper side of the aperture 151 is not dispensed from the system, and rather collects together inside the aperture, i.e. inside the dosing volume, to form a dose of flavouring. This dose of flavouring will be dispensed once the reciprocating member 17 rotates back anti-clockwise to the closed position.

In FIG. 4C, the reciprocating member 17 has been rotated anti-clockwise relative to its position in FIG. 4B so that the main portion 171, i.e. the arm, is now only partially covering the aperture 151 through the fixed base plate, exposing this time the left side of the aperture 151 to the flavouring chamber. Again, this position of the reciprocating member 17 allows a certain amount of flavouring to enter into the aperture 151 from the flavouring chamber. As before, in this position, the rotational base plate 16 has also rotated to move the two apertures 151, 161 out of alignment in order to partially or fully close the lower side of the aperture 151. This dose of flavouring will be dispensed once the reciprocating member 17 rotates back clockwise to the closed position.

Figure 5A:
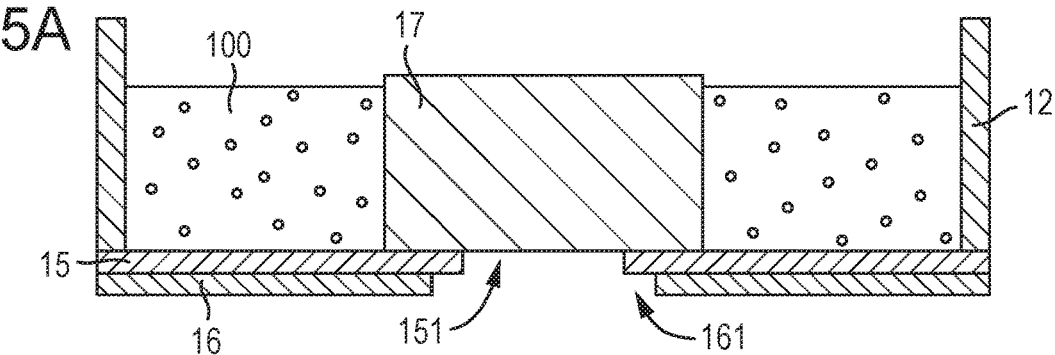
FIGS. 5A to 5D show schematic cross-sections of an embodiment of an apparatus at four different stages during operation.
Figure 5B:
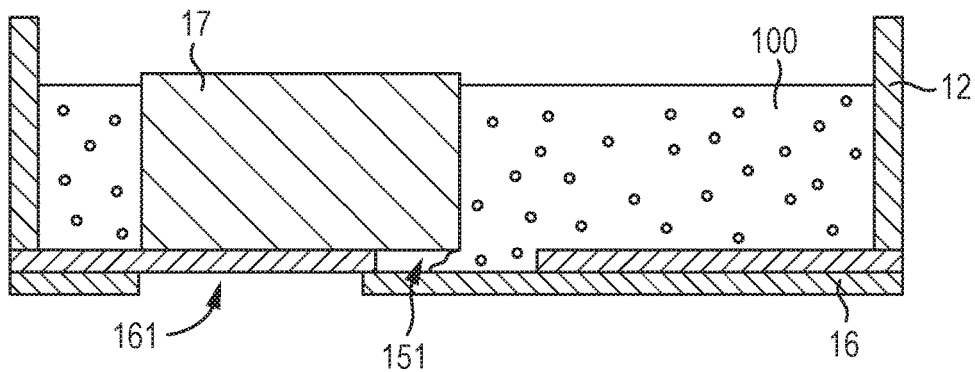
Figure 5C:
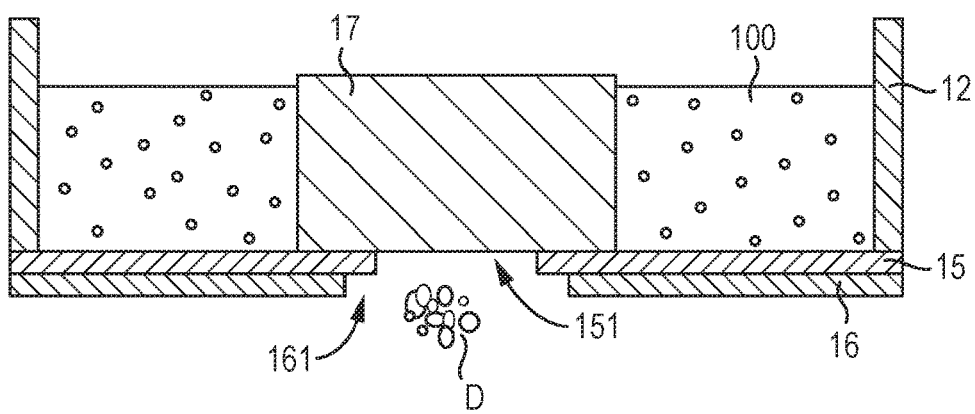
Figure 5D:
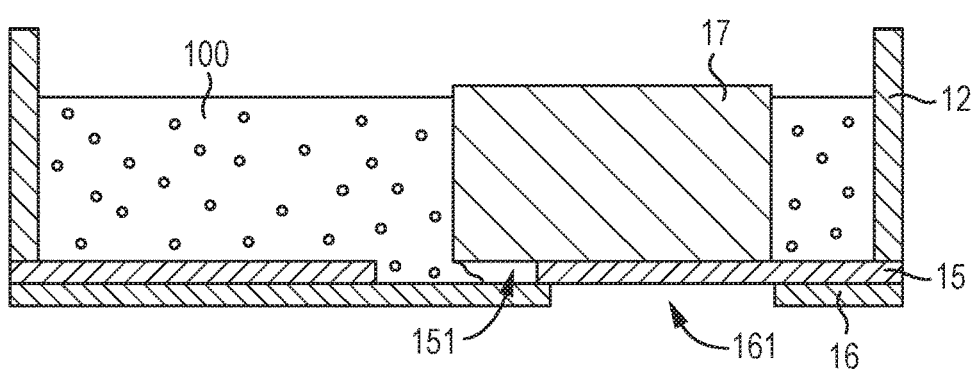
Figure 6A:
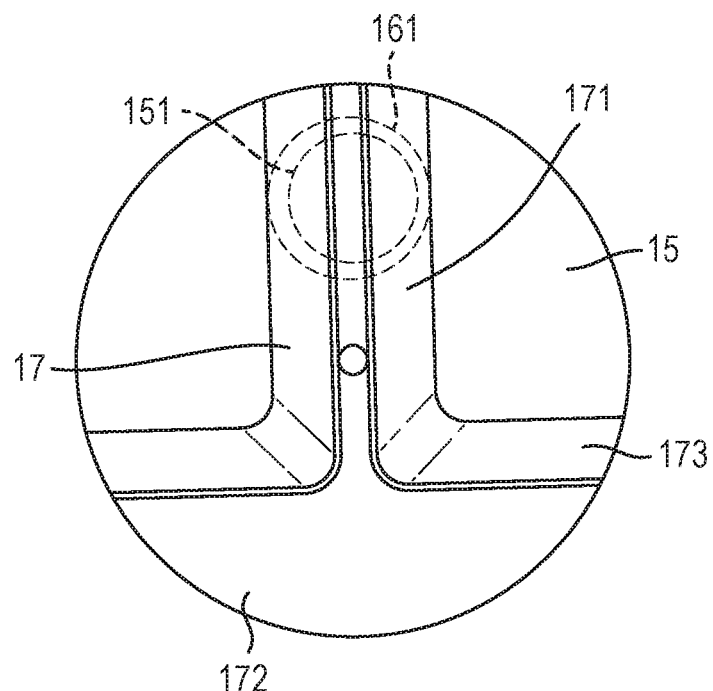
FIGS. 6A to 6D show schematic plan views of an embodiment of an apparatus at four different stages during operation.
Figure 6B:
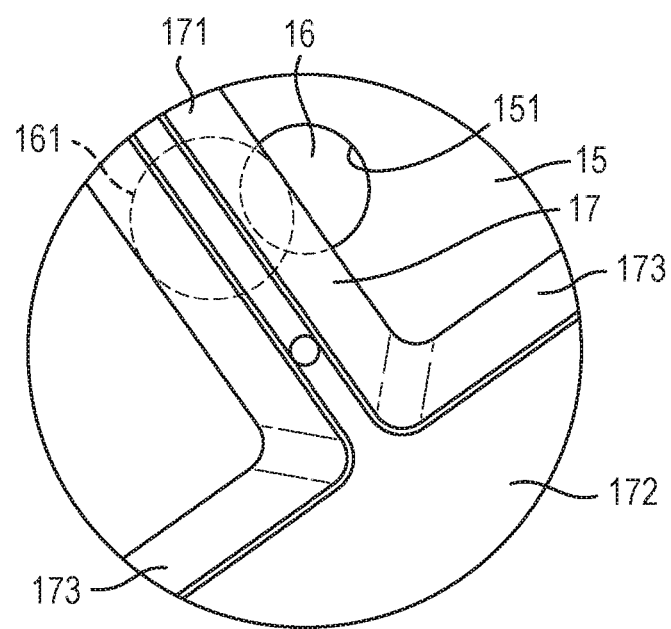
Figure 6C:
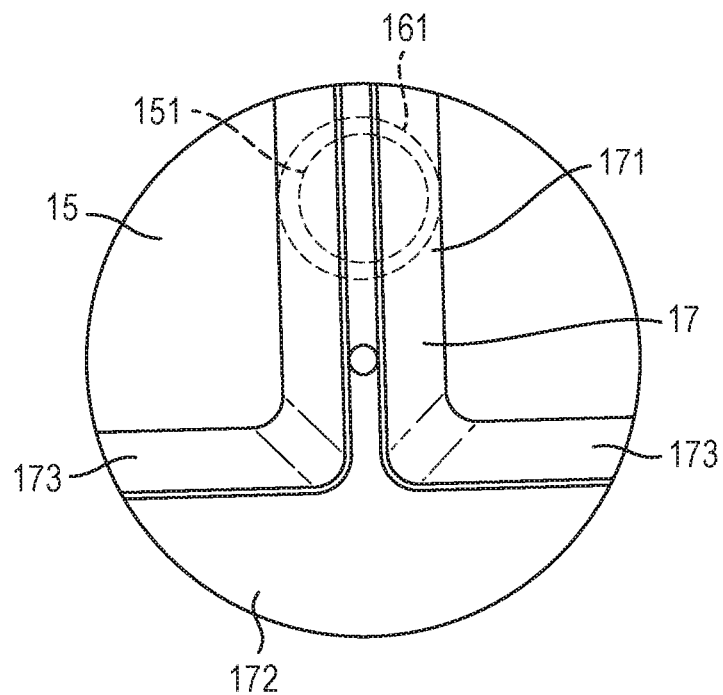
Figure 6D:
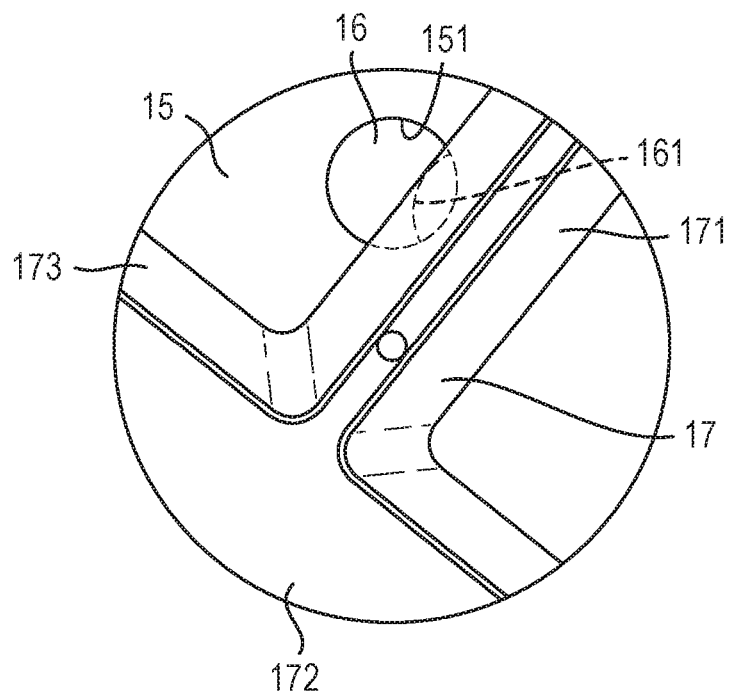
Figure 7:
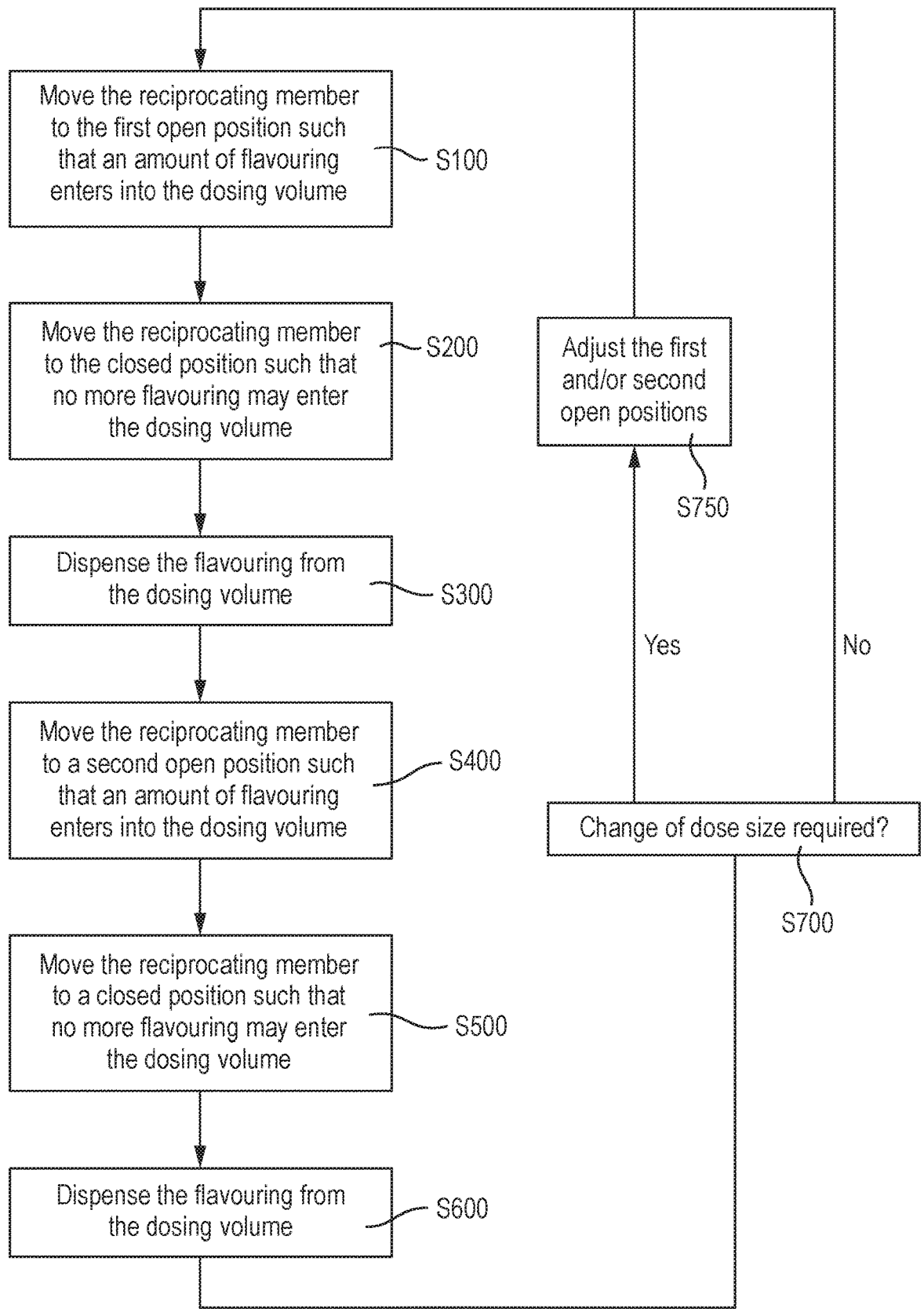
FIG. 7 shows a flow diagram illustrating a method of dispensing flavouring using an apparatus according to one of the preceding embodiments.

The reciprocating cycle can be further understood by reference to FIGS. 5A to 5D and 6A to 6D, which illustrate four different stages during the operation of the apparatus, and FIG. 7, which outlines the order of steps during operation of the apparatus.

FIGS. 5A and 6A show an apparatus with the reciprocating member in the closed position. This may be the default position for the reciprocating member, e.g. in which it spends any time idle. As can be clearly seen in FIG. 5A, the reciprocating member 17 covers the upper opening of the aperture 151 through the fixed base plate 15 so that no flavouring can enter into dosing volume. In this position, the rotational base plate 16 is arranged such that the aperture 161 therethrough is aligned with the aperture through the fixed base plate 15. The aperture 161 is larger than and entirely encompasses the aperture 151 so that no flavouring is retained therein.

Rotation of the reciprocating member 17 causes the arm defining the main portion 171 to move to the first open position, shown in FIGS. 5B and 6B, in step S100. In this first open position, the right side of the opening into the aperture 151 through the fixed base plate 15 is partially exposed. Also, it will be noted that the ancillary portion 172 of the reciprocating member has moved towards the opening 151 as the reciprocating member moves to this first open position. This movement of the ancillary portion 172, not only acts to agitate the flavouring, but also pushes the flavouring towards the aperture 151 to promote flow into the aperture, which is useful for flavouring that tends to seize up and stick together. As shown in FIG. 5B, in arriving at the first open position, flavouring has passed from the flavouring chamber 100 into the dosing volume, i.e. the space defined by the aperture 151. The amount of flavouring that enters in to the aperture 151 will depend on the amount of the aperture that was exposed to the flavouring chamber, the time of exposure, and also the degree to which the flavouring will flow freely into the aperture. Solid granular flavourings will not typically flow much beyond the exposed area of the aperture, meaning that only partially exposing the aperture will only partially fill this dosing volume, i.e. the space defined by the aperture.

The reciprocating member 17 then rotates in the opposite direction to step S100 to move the arm 171 back to the closed position in step S200. This separates the flavouring in the aperture from that in the flavouring chamber and effectively shears off a single dose of flavouring. The return of the arm 171 to the claised position also causes the dose of flavouring D to be dispensed in step S300, as the aperture 161 in the rotatable base plate moves back into alignment with the aperture 151 through the fixed base plate. The return of the reciprocating member 17 to the closed position is shown in FIGS. 5C and 6C. It will be appreciated that there may be some significant overlap in steps S200 and S300, as flavouring may begin to dispense before the reciprocating member 17 is fully returned to the closed position.

In step S400, the reciprocating member 17 continues to move through the closed position until it arrives at the second open position, which is shown in FIGS. 5D and 6D. In this second open position, the left side of the opening into the aperture 151 through the fixed base plate 15 is partially exposed. Again, the ancillary portion 172 of the reciprocating member acts to push the flavouring towards the open aperture 151 to promote filling. As shown in FIG. 5D, flavouring has passed from the flavouring chamber 100 into the dosing volume, i.e. the space defined by the aperture 151, during this movement of the reciprocating member to the second open position. Again, the amount of flavouring that enters in to the aperture 151 will depend on the amount of the aperture that was exposed to the flavouring chamber, the time of exposure, and also the degree to which the flavouring will flow freely into the aperture. Typically, the second open position will expose the same amount of the aperture 151 as the first open position so that both measure out doses of substantially the same size, although this is not essential.

The reciprocating member 17 then rotates in the opposite direction to step S400 to move the arm 171 back to the closed position in step S500. This position is the same position shown in FIGS. 5C and 6C. This causes flavouring to again be dispensed in step S600. At this point, one full reciprocation cycle of the reciprocating member 17 has been completed. Multiple reciprocation cycles may be employed one after the other to repeatedly dispense doses of flavouring.

If one wants to adjust the size of a dose of flavouring, this may be conveniently done after step S600. This option is reflected by S700 in the flow diagram of FIG. 7. If the dose size is to be adjusted, then the first and second open positions may be adjusted in step S750. Here, for example, an operator may change the range of the reciprocation motion of the reciprocating member 17 in order to change the degree to which the aperture 151 is exposed to the flavouring chamber. A smaller reciprocating range will expose less of the aperture 151 and so result in a smaller dose of flavouring. Similarly, a larger reciprocating range will expose more of the aperture and so provide a larger dose. While the option of changing the dose of flavouring is shown only after step S600, it would also be possible to adjust the reciprocation range after step S300, i.e. while the reciprocating member is at the closed position immediately after the first open position.

If no change to the size a dose of flavouring is required, then the reciprocating member 17 may pass through the closed position at which it arrived in step S600 and continue once again to the first open position, shown in FIGS. 5A and 6A (i.e. step S100), in order to start a new reciprocation cycle and collect a new dose of flavouring of substantially the same size. Alternatively, if the range of the reciprocating motion is changed, then the reciprocating member 17 will move from the closed position at which it arrived in step S600 to the adjusted first open position, at which a dose of flavouring of a new size will be collected in the aperture 151.

The operation of the machine has been described above, but it will also typically be desirable to calibrate the dose sizes before operation. The machine may be calibrated for any particular flavouring type by setting an arbitrary first open position and dispensing a dose of flavouring onto a weigher. The weight of the flavouring may then be measured and the range of reciprocation adjusted accordingly, i.e. a larger reciprocation range for a heavier dose of flavouring or a smaller reciprocation range for a lighter dose of flavouring. Another dose of flavouring may then be dispensed, e.g. by moving the reciprocating member to the adjusted first or second open position and back to the closed position, to dispense a dose of flavouring. This dose of flavouring may be weighed again and any further adjustment made to fine tune the dose size. This may also be used to build up a series of predetermined first and second open positions corresponding to preferred weight options. For example, one reciprocating range may be known to provide 5 grams of a particular flavouring and another reciprocation range may be known to provide 10 grams of that flavouring, so that one can conveniently change between two different flavouring dose sizes. Different flavouring types may have different predetermined open positions, as their flow characteristics may affect the relationship between the size of the dose and the amount of the aperture 151 that is exposed during each reciprocation.

It should also be noted that the system may also be adjusted so that the entire of the aperture is exposed at each first and second open position. This would provide a maximum size of a dose of flavouring and would correspond to an entirely filled dosing volume.

The invention claimed is:

1. A flavouring dispenser for dispensing doses of flavouring, the flavouring dispenser comprising:
 a flavouring chamber for containing flavouring;

a dosing member having a dosing volume for receiving flavouring from the flavouring chamber, the dosing member defining an opening to the dosing volume through which flavouring is received from the flavouring chamber;

a reciprocating member movable relative to the dosing member between a closed position, at which the opening is isolated from the flavouring chamber by the reciprocating member, to a first open position, at which the opening is partially exposed to the flavouring chamber such that an amount of flavouring may enter into the dosing volume via the opening, and back to the closed position, such that the flavouring may be dispensed by the dosing member, wherein the reciprocating member comprises a separating surface, which acts to close the dosing member opening so as to isolate it from the flavouring chamber, and further comprises a body extending away from the separating surface, the body acting to displace flavouring within the flavouring chamber as the reciprocating member moves between the open and closed positions;

wherein the dosing member further defines a second opening to the dosing volume, through which flavouring is dispensed from the dosing volume, and further comprising a dispensing member configured to selectively open and close the second opening;

wherein the first open position of the reciprocating member is adjustable to select from a continuous range of possible first open positions in order to change a range of the reciprocating motion of the reciprocating member such that the degree to which the opening is exposed to the flavouring chamber may be changed so as to adjust the amount of flavouring received in the dosing volume; and further comprising a motorized bi-directional drive system adapted to move the reciprocating member in a reciprocating manner between the closed position and the first open position, wherein the range of the reciprocating motion imparted by the motorized bi-directional drive system is adjustable within a continuous range to adjust the first open position of the reciprocating member from the continuous range of possible first open positions, and wherein the motorized bi-directional drive system is adapted to repeatedly move the reciprocating member in a reciprocating manner between the closed position and the first open position so as to repeatedly dispense doses of flavouring of the same size.

2. A flavouring dispenser according to claim 1, wherein the reciprocating member is movable relative to the flavouring chamber and/or wherein the dosing member is fixed relative to the flavouring chamber as the reciprocating member moves between the open and closed positions.

3. A flavouring dispenser according to claim 1, wherein the reciprocating member is movable relative to the dosing member between the closed position and a second open position, at which the opening is partially exposed to the flavouring chamber such that an amount of flavouring may enter into the dosing volume via the opening, and back to the closed position, such that the flavouring may be dispensed by the dosing member, wherein the second open position of the reciprocating member is adjustable such that the degree to which the opening is exposed to the flavouring chamber may be changed so as to adjust the amount of flavouring received in the dosing volume.

4. A flavouring dispenser according to claim 3, wherein the reciprocating member is movable relative to the dosing member between the first open position and the second open position by passing through the closed position such that one full reciprocation cycle of the reciprocating member includes both the first and second open positions.

5. A flavouring dispenser according to claim 1, wherein the dispensing member comprises a closing surface defining a dispense opening therethrough, through which flavouring is dispensed from the flavouring dispenser, wherein the dispensing member is movable relative to the dosing member to vary the alignment of the second opening and the dispense opening so as to selectively dispense flavouring.

6. A flavouring dispenser according to claim 5, wherein the dispensing member is movable relative to the dosing member between at least a first filling position, at which the second opening is at least partially closed by the dispensing member, and a dispensing position, at which the dispense opening substantially aligns with the second opening.

7. A flavouring dispenser according to claim 6, wherein the closed position of the reciprocating member corresponds to the dispensing position of the dispensing member and each open position of the reciprocating member corresponds to a respective filling position of the dispensing member.

8. A flavouring dispenser according to claim 5, wherein the dispensing member is rotationally fixed relative to the reciprocating member such that movement of the reciprocating member simultaneously operates the dispensing member.

9. A flavouring dispenser according to claim 5, wherein the dispense opening entirely overlaps the second opening when the openings are aligned.

10. A flavouring dispenser according to claim 1, wherein the body is shaped to provide the reciprocating member with a substantially wedge-shaped or triangular-shaped cross-section.

11. A flavouring dispenser according to claim 1, wherein the reciprocating member comprises a main portion, which closes the dosing member opening so as to isolate it from the flavouring chamber, and an ancillary portion spaced from the main portion, the ancillary portion acting to displace flavouring within the flavouring chamber as the reciprocating member moves between the open and closed positions.

12. A flavouring dispenser according to claim 11, wherein the reciprocating member is rotatable about an axis of rotation and wherein the dosing member opening is offset from the axis of rotation and wherein the axis of rotation is located between the main portion of the reciprocating member and the ancillary portion of the reciprocating member.

13. A flavouring dispenser according to claim 12, wherein the ancillary portion of the reciprocating member comprises one or more guiding surfaces configured to urge flavouring towards the opening to the dosing volume as the reciprocating member is rotated about the axis of rotation.

14. A flavouring dispenser according to claim 1, wherein the reciprocating member is rotatable about an axis of rotation and wherein the dosing member opening is offset from the axis of rotation.

15. A flavouring dispenser according to claim 1, wherein the footprint of the reciprocating member within the flavouring chamber is at least 10% of a footprint of the flavouring chamber.

16. A method of dispensing doses of flavouring comprising:

providing a flavouring chamber containing flavouring;

providing a dosing member having a dosing volume for receiving flavouring from the flavouring chamber, the dosing member defining an opening to the dosing volume through which flavouring is to be received from the flavouring chamber, wherein the dosing member further defines a second opening to the dosing volume, through which flavouring is dispensed from the dosing volume, and further comprising a dispensing member configured to selectively open and close the second opening;

with a motorized bi-directional drive system, moving a reciprocating member from a closed position, at which the opening is isolated from the flavouring chamber by the reciprocating member, to a first open position, at which the opening is partially exposed to the flavouring chamber so that an amount of flavouring enters into the dosing volume via the opening, and moving the reciprocating member back to the closed position, wherein the motorized bi-directional drive system is adapted to repeatedly move the reciprocating member in a reciprocating manner between the closed position and the first open position so as to repeatedly dispense doses of flavouring of the same size; and dispensing the flavouring received in the dosing volume as a first dose of flavouring;

wherein the first open position of the reciprocating member is selected from a continuous range of possible first open positions which change a range of the reciprocating motion of the reciprocating member with the motorized bi-directional drive system so as to vary a degree to which the opening is exposed to the flavouring chamber based on a desired amount of flavouring to be received in the dosing volume.

17. A method according to claim 16, further comprising, after dispensing the flavouring received in the dosing volume, moving the reciprocating member from the closed position to a second open position at which the opening is partially exposed to the flavouring chamber so that an amount of flavouring enters into the dosing volume via the opening, and back to the closed position, and dispensing the flavouring received in the dosing volume as a second dose of flavouring, wherein the second open position of the reciprocating member is selected from a plurality of possible second open positions which vary the degree to which the opening is exposed to the flavouring chamber based on a desired amount of flavouring to be received in the dosing volume.

18. A method according to claim 17, wherein moving the reciprocating member from the first open position to the closed position and to the second open position comprising moving the reciprocating member in one direction along a linear or arcuate path.

19. A method according to claim 17, wherein the opening is partially exposed to the flavouring chamber by the same amount at the first and second open positions such that the first and second doses of flavouring are the same size.

20. A method according to claim 16, comprising adjusting the first open position of the reciprocating member to a different one of the plurality of possible first open positions and moving the reciprocating member from the closed position to the adjusted first open position and back to the closed position so that a different amount of flavouring enters into the dosing volume via the opening, and dispensing the flavouring received in the dosing volume as an adjusted first dose of flavouring, the adjusted first dose of flavouring thereby having a different size than said first dose of flavouring.

* * * * *